United States Patent [19]

Petrak et al.

[11] Patent Number: 4,557,884
[45] Date of Patent: Dec. 10, 1985

[54] REFRACTORY

[75] Inventors: Daniel R. Petrak, Lynchburg, Va.; Howard M. Winkelbauer, W. Mifflin, Pa.; Thomas R. Kleeb; Ke-Chin Wang, both of Pittsburgh, Pa.

[73] Assignee: Dresser Industries, Inc., Dallas, Tex.

[21] Appl. No.: 626,255

[22] Filed: Jun. 29, 1984

Related U.S. Application Data

[60] Continuation-in-part of Ser. No. 321,155, Nov. 13, 1981, abandoned, which is a division of Ser. No. 149,609, May 14, 1980, abandoned.

[51] Int. Cl.$^4$ .............................................. C04B 35/02
[52] U.S. Cl. ........................................ 264/65; 501/96
[58] Field of Search .............................. 264/65; 501/96

[56] References Cited

U.S. PATENT DOCUMENTS

| | | | |
|---|---|---|---|
| 2,929,126 | 3/1960 | Bollack | 501/96 |
| 3,991,148 | 11/1976 | Lumby | 264/56 |
| 4,460,528 | 7/1984 | Petrak et al. | 264/65 |

*Primary Examiner*—Donald Czaja
*Assistant Examiner*—MaryLynn Fertig
*Attorney, Agent, or Firm*—Barry E. Deutsch

[57] ABSTRACT

A means for producing nitride bonded refractory shapes, in situ, by mixing an aluminum metal powder, relatively pure silica and a refractory aggregate. The mixes are pressed into shapes and burned at elevated temperatures in a nitriding atmosphere to form the bond.

4 Claims, No Drawings

REFRACTORY

CROSS REFERENCE TO RELATED APPLICATION

This is a continuation-in-part of application Ser. No. 321,155 filed Nov. 13, 1981, now abandoned which is a divisional application of application Ser. No. 149,609 filed May 14, 1980, by Daniel R. Petrak, H. M. Winkelbauer, T. R. Kleeb and K. C. Wang, entitled "REFRACTORY" and now abandoned.

Silicon nitride, aluminum nitride and aluminum oxide in the form of fine powders when thoroughly and uniformly mixed in suitable proportions, and heated at elevated temperatures, can provide ceramics which have relatively good high temperature properties and application in excess of 1400° C. Nitride compounds referred to as sialon compounds have been synthesized by mixing alpha and/or beta silicon nitride with alpha and/or gamma alumina powder. Sialon generally means an intimate dispersion of alumina oxide throughout a silicon nitride matrix. It is believed that upon sintering, the material becomes a solid solution of aluminum oxide in silicon nitride. The letters which make up the term "sialon" are the letters taken from the chemical abbreviation for the elements therein, that is, silicon, aluminum, oxygen and nitrogen.

Considerable effort has been directed to the development of ceramic articles containing 80% and more of silicon nitride, silicon oxynitride and/or sialon. These articles consist predominantly of single phase nitrides and display good thermal shock resistance, strength and corrosion resistance. Little information exists in the utilization of these nitride phases as the bonding agent in conventional refractories. Several limiting factors which have retarded large scale development of nitride bonded refractories include the high cost of purchased silicon nitride, the instability of certain oxynitrides at high temperature, and the hydrolizing tendency of possible starting materials, such as, aluminum nitride and magnesium nitride. To overcome these obstacles, it would be advantageous to form, in situ, nitride phases by the addition of a single metallic metal powder which can react with gaseous nitrogen to produce a crystalline nitride phase capable of ceramic bonding to relatively inexpensive refractory grains. This approach will greatly lower the cost of nitride articles and couple the distinct advantages of nitride compounds to the established advantages of conventional refractory grains.

It is an object of the present invention to produce nitride bonded refractories with improved physical properties compared to refractories made with the addition of two or more reactive metal powders.

Another object of the invention is to join a sialon and other nitride phases with conventional refractory grains which are typically bonded by oxides which can be readily decomposed by certain metals to provide properties, such as, non-wetability by molten metals, resistance to chlorine attack and low thermal expansion.

A further object of the invention is to provide nitride bonded refractories having improved porosity and relatively good room temperature and elevated temperature strength.

In accordance with the present invention, there is provided a method for producing nitride bonded refractory shapes in situ. A mixture is prepared comprising about 1 to 25%, by weight, aluminum metallic powder, about 1 to 25%, by weight, substantially pure silica and the balance a refractory brick making size graded refractory aggregate. The mixes are pressed into refractory shapes and burned at elevated temperatures in a nitriding atmosphere to form the nitride bond.

In a preferred embodiment, the aluminum comprises about 1 to 16% and the substantially pure silica comprises about 1.5 to 20%, by weight, of the mix. The shapes are preferably burned at a temperature between about 1090° and 1750° C. and the nitriding atmosphere is composed of either gaseous nitrogen, industrial annealing gas, or ammonia gas. The refractory aggregate is preferably selected from silicon carbide, fused mullite and magnesite.

In a nitrogen atmosphere, at temperatures of about 800° C., aluminum reduces silica forming silicon, aluminum oxide, aluminum nitride, and gamma aluminum oxynitride. It is important that this reaction occur because in a nitrogen atmosphere, nitrogen can react with free silica near 1400° C. to produce silicon oxynitride and free oxygen. Free oxygen will cause oxidation of the sialon bond which we are trying to form. By removing oxygen from silica and combining it with aluminum to form alumina we ensure the stability of the sialon bond.

The use of aluminum and silica as starting materials to form a sialon bond is unique and advantageous compared to prior methods of forming sialon. Silica is used as an inexpensive source of silicon. Aluminum is used to reduce the silica and to form aluminum oxide, which is incorporated in the sialon structure. The formation of the stable alumina compound at the relatively low temperature level of 800° C. prevents the formation of undesirable free oxygen which would otherwise be generated if silica were reacted with nitrogen at temperatures approaching 1400° C. At a higher temperature of about 1250° C., silicon formed in the above reaction begins to be nitrided to form silicon nitride and the aluminum oxide, aluminum nitride and aluminum oxynitride enters into the silicon nitride structure as a solid solution to form beta prime sialon.

During nitriding, the metallic phase undergoes a gas-metal reaction and forms minute crystals surrounding the metal nucleus. Maintaining a hold during the firing process ensures drainage of the metal from the nucleus through the pores of the crystalline mat which allows additional nitridization of the metal. During the end of the hold period, true ceramic bonding is achieved with the coarse refractory grains by virtue of their solubility in the nitride phases.

To successfully achieve nitridation and also an economical firing schedule, it is preferred that the starting metal powder be as fine as possible. Generally, the aluminum powder should have an average particle diameter of about 34 microns with 90% of the particles being finer than 70 microns. The silica used in the mixes may have one or more ranges of particle size. For instance, extremely fine silica can be used which has an average particle diameter of less than about 1 micron. However, incorporation of large quantities of this exceedingly fine material to a refractory mix, often results in pressing difficulties. It is advantageous to add the very fine silica with a coarser form of silica to obtain the large amount of silica needed in the mix.

It is also preferred that the reactive material not exceed about 20% of the mix for economic reasons. Also, larger quantities do not result in articles with materially improved physical properties.

In the examples illustrated below, aluminum powder was mixed with silica and either silicon carbide, fuse mullite or magnesite. A solution of dextrin and/or lignin liquor and water was used as a temporary binder. The mixes were formed into shapes by power pressing to about 18,000 psi. The bricks were than fired in the presence of flowing nitrogen to a temperature of about 2600° F. with a holding time of about four hours. Mixes were also prepared containing a combination of both aluminum and silicon metal powders. The overall results indicated that the mixes made with only a single metal addition was stronger and less porous than mixes made with the two metal additions. The various bonding phases are also shown in Table I.

TABLE I

| MIX | 1 | 2 | 3 | 4 | 5 | 6 | 7 | 8 |
|---|---|---|---|---|---|---|---|---|
| Silicon Carbide | 74% | 75% | — | — | — | — | — | — |
| Fused Mullite | — | — | 69% | 65% | 62% | — | — | — |
| Deadburned Magnesite | — | — | — | — | — | 94% | 80% | 70% |
| Silica, less than 1 micron | 10% | 10% | 13% | 5% | 3% | 3% | 4% | 5% |
| Aluminum | 16% | 10% | 13% | 15% | 15% | 3% | 10% | 15% |
| Silicon | — | 5% | 5% | — | 5% | — | — | — |
| Silica −200 mesh | — | — | — | 15% | 15% | — | 6% | 10% |
| Apparent Porosity | 17.6 | 17.9 | 21.3 | 21.9 | 21.3 | 17.8 | 16.5 | 14.8 |
| Modulus of Rupture psi at Room Temperature | 4350 | 3400 | 2880 | 2480 | 2110 | 350 | 2120 | 1605 |
| Modulus of Rupture psi at 1314° C. | 5560 | 4360 | 2910 | — | — | — | — | — |
| Primary Bonding Phase | Beta Prime Sialon | Beta Prime Sialon | Beta Prime Sialon | Beta Prime Sialon | Beta Prime Sialon | [Magnesium Sialon Polytype] | | |

In the above mixes, the refractory aggregate was sized such that about 5 to 22% was retained on a 10 mesh screen, about 23 to 36% was −10+28 mesh, about 8 to 25% was −28+65 mesh, about 7 to 10% was −65+200 mesh and about 30 to 35% passed a 200 mesh screen. All of the above mesh sizes are based upon the Tyler standard series.

As to the raw materials used above, the aluminum powder was pure aluminum metal, and the silica analyzed in excess of 98% $SiO_2$. The refractory aggregate used in the examples have the approximate chemical analysis as shown in Table II below.

TABLE II

| | Silicon Carbide | Fused Mullite | Deadburned Magensite |
|---|---|---|---|
| $SiO_2$ | — | 22.9% | 0.7% |
| $Al_2O_3$ | 0.4 | 76.4 | 0.2 |
| $TiO_2$ | 0.1 | 0.1 | — |
| $Fe_2O_3$ | 0.8 | 0.3 | 0.2 |
| CaO | 0.2 | — | 0.6 |
| MgO | 0.02 | — | 98.3 |
| Alk. | 0.03 | 0.35 | — |
| Calculated SiC | 96.5 | — | — |

All of the chemical analyses are based on an oxide analysis which would not indicate the carbon content of the silicon carbide.

The embodiments of the invention in which an exclusive property or privilege is claimed are defined as follows:

1. A method for producing nitride bonded refractory bricks, in situ, comprising mixing, by weight, from about 1 to 25% aluminum, about 1 to 25% substantially pure silica and the balance a refractory brickmaking size graded refractory aggregate, selected from the group consisting of silicon carbide, fused mullite and deadburned magnesite, pressing said mixes into refractory bricks, burning the bricks at a first temperature in a nitriding atmosphere for a time sufficient to form silicon and reactive alumina, said temperature being less than the temperature level at which a sialon intergranular bond will form; further burning the bricks at a temperature exceeding the first temperature in a nitriding atmosphere to form silicon nitride from the previously formed silicon; and forming a sialon intergranular bond for the refractory brick by reacting the previously formed reactive alumina with the silicon nitride.

2. Method of claim 1 in which the aluminum comprises, by weight, about 1 to 16% and the substantially pure silica comprises, by weight, about 1.5 to 20% of the mix.

3. Method of claim 1 in which the first temperature at which the bricks are burned is approximately 800° C. and the second temperature is at least 1250° C.

4. Method of claim 1 in which the nitriding atmosphere is selected from the group consisting of gaseous nitrogen, industrial annealing gas and ammonia gas.

* * * * *